United States Patent Office 3,382,239
Patented May 7, 1968

3,382,239
PROCESS FOR THE PREPARATION
OF LACTONES
Derek Harold Richard Barton, Northwood, England, assignor to Research Institute for Medicine and Chemistry, Inc., Cambridge, Mass., a corporation of Massachusetts
No Drawing. Filed June 26, 1964, Ser. No. 378,441
Claims priority, application Great Britain, July 3, 1963, 26,391/63
14 Claims. (Cl. 260—239.57)

ABSTRACT OF THE DISCLOSURE

Lactones are prepared from N-bromo, chloro or iodo carboxylic primary or secondary amides, which have a carbon-attached hydrogen atom conformationally adjacent to the nitrogen atom of the N-halogeno-amide group, by homolytic fission of the nitrogen-halogen bond. Homolytic fission may be effected by illumination with radiation absorbed by the nitrogen-halogen bond and lactone formation may occur spontaneously. If it does not, the intermediate product is subjected to hydrolysis to form the lactone ring.

In synthetic organic chemistry, it is frequently advantageous to introduce a lactone grouping into a molecule either to impart particular properties to an industrial product, as in the lactonic perfumes or lactone-containing antimicrobials, or to produce an intermediate in which the lactone group may be subsequently reacted. It is normally necessary, however, in preparing a lactone, that a carboxyl group, or a functional derivative such as an acid halide group, is conformationally adjacent to a hydroxyl group, halogen atom etc. so that reaction between the two substituents effects the desired cyclisation. If there is no hydroxyl group, halogen atom etc. in the conformationally adjacent position, e.g. the γ- or δ-position in an aliphatic carboxylic acid, such an atom or group has to be introduced previously and it is often difficult to direct substitution into the desired position.

It has now been found that lactones can be prepared from N-halogeno carboxylic primary and secondary amides (which are readily prepared from carboxylic amides and hence from the corresponding acids) by homolytic fission of the nitrogen-halogen bond, for example by illumination with radiation absorbed by that bond followed, where lactone-formation has not taken place spontaneously, by treatment of the resulting product with aqueous alkali. Other methods of homolytic fission include treatment with free-radical initiators.

The intermediate reaction products resulting from irradiation have not been characterised but are believed to include halogeno-amides wherein the halogen atom of the N-halogeno-amide group has been exchanged with a hydrogen atom in a position conformationally adjacent or able to become conformationally adjacent to the nitrogen atom. Thus, for example, the crude irradiation products contain combined iodine and when reacted with zinc and acetic acid will in many cases yield the parent amide with removal of halogen, a reaction to be expected of the postulated rearranged halogeno-amides.

It is thought that treatment of the crude products of irradiation with aqueous alkali effects hydrolysis of the C-attached halogen atom and ring closure produces the desired lactone. It is likely, however, that other products of the irradiation may also undergo hydrolysis to yield the lactone simultaneously.

According to the present invention, therefore, there is provided a process for the preparation of lactones in which an N-halogeno carboxylic amide possessing a carbon-attached hydrogen atom conformationally adjacent or able to become conformationally adjacent to the nitrogen atom of the N-halogeno amide group thereof, is subjected to homolytic fission of the nitrogen-halogen bond thereof whereby there is formed, either spontaneously or after reaction with an alkaline substance, a lactone ring wherein the carbonyl group of the amide group initially present is joined by a further oxygen atom to the carbon atom initially carrying the conformationally adjacent hydrogen atom, the nitrogen atom of said N-halogeno amide group having attached thereto a hydrogen atom or an aliphatic, araliphatic or aryl substituent.

By the term "conformationally adjacent" atoms or groups is meant that these are so positioned that they may approach without appreciable molecular strain to within the distance normal for an interatomic bond. Thus for example, in the steroids, a hydroxyl group in the 6β-position is conformationally adjacent to a hydrogen at the 19-position while a hydroxyl in the 1β-position is conformationally adjacent to a hydrogen at the 11α-position.

It will be seen that in the above examples the conformationally adjacent atoms or groups are separated by a chain of four intervening carbon atoms, thereby allowing the conformationally adjacent atoms or groups to form part of a six-membered structure which, as is well-known, is normally substantially free from strain. Naturally, where the intervening carbon atoms form part of a structure in which bond rotation and movement is restricted, as in polycyclic structures such as steroids, the arrangement of all the bonds must allow the relevant atoms or groups to become adjacent.

In the general case, it is not necessary for all the atoms intervening between the CO group of the amide and the carbon carrying the conformationally adjacent hydrogen atom to be carbon and it is possible for at least one intervening atom to be oxygen, sulphur or nitrogen, provided that the compound is chemically stable. The process of the invention is especially useful for converting halogeno amides possessing the grouping

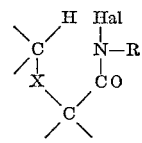

into lactones containing the grouping

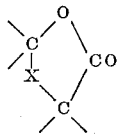

where X is a methylene, methylidene, methylidyne or imino group or a nitrogen, oxygen or sulphur atom.

The N-halogeno amide starting compound may thus have the general formula

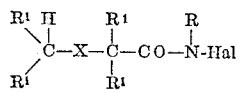

where Hal and R have the above meanings and the groups R¹, which may be the same or different, are hydrogen atoms or aliphatic, cycloaliphatic, araliphatic or aromatic groups or two or more together represent aliphatic or araliphatic groups attached by a double bond or form cycloaliphatic, aromatic or heterocyclic ring structure. The groups R¹ may if desired carry substituents, for example fluorine atoms or hydroxy, alkoxy, aralkoxy, aryloxy, keto, acycloxy or acyl groups. The compounds in which Hal is iodine have not been described previously and constitute a further feature of the invention.

The reaction may thus, for example, be used to prepare steroid lactones such as the lactone of 3β-acetoxy-16β - hydroxy - 11-oxo-5α-pregnane-20-carboxylic acid, which is of use as an anti-aldosterone agent, and is also of use in the perfume industry in preparing a number of lactonic perfumes for example undecanoic acid γ-lactone. A number of antimicrobial agents are also lactones, e.g. acetomycin and α-methylene butyrolactone.

Where the parent amide is derived from an aliphatic carboxylic acid such as stearic acid, both γ- and δ-lactones may be formed presumably because the hydrogen atoms in the γ- and δ-positions with respect to the CO group are both readily able to become conformationally adjacent to the nitrogen atom.

The substituents which may be present on the N-atom are aliphatic, araliphatic and aryl groups such as methyl, ethyl, propyl, cyclohexyl, benzyl, phenyl groups etc. It is preferred however to use unsubstituted N-halogeno amides in the reaction since these give rise in many cases to especially good results.

The homolytic fission of the N-halogen bond is preferably effected by irradiation of the N-halogeno-amide with radiation of a wavelength absorbed by the bond, e.g. with radiation from a mercury vapour or tungsten lamp. In such a case, a solvent is preferably present and should not of course be substantially opaque to the radiation used. Aromatic hydrocarbon solvents such as benzene, toluene etc. halogenated hydrocarbons such as chloroform, methylene dichloride etc. and ether solvents such as diethyl ether, dioxan, tetrahydrofuran are useful, the choice of solvent being, however, largely dictated by the relative solubility of the starting material. Hydroxylic or unsaturated aliphatic hydrocarbon solvents should, however, be avoided.

The hydrolysis of the fission products with an alkaline substance can be effected, for example, with an alkali metal hydroxide, carbonate or alkoxide. Hydrolysis can also be effected using neutral or acidic media and according to a modification of the invention the products of homolytic fission are hydrolysed under acidic or neutral conditions whereby a lactone is formed. The acid conditions may be achieved using a mineral acid and it is preferred that an iodine reducing agent be present e.g. an alkali metal bisulphite.

The N-halogeno-amide starting material can be prepared, in the case where the halogen is bromine or chlorine, by methods conventional for N-halogenation amides, for example reaction of the parent amide with an alkali metal typobromite or hypochlorite.

It has been found that N-iodoamides can be prepared from the corresponding amides by reaction of the amide with a source of positive iodine ions. The source of positive iodine ions may, for example, be N-iodosuccinimide, cyanogen iodide, iodine monochloride, iodide monobromide etc. or a hypoiodite generated in situ by reaction of iodine and a heavy metal oxide or acylate such as lead tetraacetate, lead tetraproprionate, mercuric oxide, silver oxide etc. The reagent system of choice, however, is iodine and a hypochlorite, hypobromite or nitrite ester of a tertiary alcohol, especially of tertiary butyl alcohol.

The N-iodination is advantageously effected in the presence of a hydrogen halide acceptor, for example an inorganic weak base such as calcium carbonate. An inert solvent such as a hydrocarbon is advantageously present and since it is normally convenient to effect the irradiation of the N-iodo amide without isolation, the solvent is preferably one which is not opaque to the irradiation to be used or reactive under the irradiation conditions.

The generation of positive halogen ions is also useful in the preparation of the N-chloro or N-bromo amides, and a tertiary alkyl hypochlorite or hypobromite is a useful halogenating agent, especially when a free halogen is present as a catalyst. Thus, for example, t-butyl-hypochlorite and bromine react readily in the dark with octadecanamide to produce N-chloro-octadecanamide.

As indicated above, the preferred method is to irradiate directly the reaction mixture used to prepare the N-halogeno amides without isolation of the N-halogeno compounds. If, however, the N-halogenation reaction is carried out in the absence of radiation effecting homolytic fission of the nitrogen-halogen bond, e.g. completely in the dark, it is normally possible to isolate the N-halogeno-amide should this be required.

It is also generally convenient to react the rearranged halogeno-amide, after irradiation, with the base, thereby lactonising in situ without isolation, and in general the most preferred procedure for preparing lactones is to react the starting amide with iodine and a tertiary butyl hypochlorite or like reagent with simultaneous irradiation, e.g. with a mercury vapour lamp, followed by addition of aqueous alkali, e.g. an alkali metal hydroxide, carbonate, alkoxide etc. and isolation of the desired lactone, e.g. by chromatography etc. In general, it is found that a high yield of lactone is obtained if the oxidising agent such as t-butyl hypochlorite is used in excess.

Some interesting features of the overall reaction, which may be of significance when considering the reaction mechanism, are as follows:

(a) Iodine is rapidly absorbed at first but is regenerated during the reaction. When a small molar excess of lead tetra-acetate is used some lead iodide is produced.

(b) The absorption maximum at 1765 cm.$^{-1}$ indicative of the presence of γ-lactone is absent in the crude product but appears after hydrolysis. However, the crude products from some reactions, particularly those conducted at higher temperatures, have a strong absorption maximum at 2,300 cm.$^{-1}$ possibly suggesting the presence of isocyanate.

(c) Yields of lactone are highest when a large molar excess of lead tetra-acetate or t-butyl hydrochlorite and iodine is used.

When stearamide was irradiated with lead tetraacetate-iodine both γ- and δ-stearolactone were produced in excellent combined yield. The structure of δ-stearolactone was confirmed by its infrared spectrum and its conversion into 5-hydroxystearic acid, and N-benzyl-5-hydroxystearamide. o-Toluamide was similarly converted into phthalimide.

When stearamide in methylene dichloride was treated with t-butyl hypochlorite-iodine in the dark, the precipitate had properties consistent with its formulation as an isomer (I) of N-iodostearamide. When treated with iodide ion in acetic acid it afforded stearamide and iodine quantitatively. This isomer of N-iodostearamide was also formed in benzene at <5° but at room temperature another isomer (II) was obtained. It was also formed when the isomer (I) was crystallised from acetone or ethyl acetate. However, both isomers crystallise unchanged from chloroform even when the saturated solutions are seeded with crystals of the other isomer. The infrared spectra of the two forms appear to be identical in chloroform solution, but in Nujol they are very different. It thus appears that the two isomers are chemically different and are not just mesomorphic forms.

The isomer (I) of N-iodostearamide when irradiated in benzene liberated iodine and stearamide, and the crude product yielded γ-stearolactone after hydrolysis. However, the isomer (II) was substantially recovered unchanged after similar treatment. This apparent distinction between the two compounds may be attributed to their differing solubilities in benzene, since in dilute chloroform solution on a semi-micro scale both underwent rapid photolysis under ultraviolet irradiation as was evidenced by changes in the infrared spectra.

Photolysis of certain amides with t-butyl hypochlorite-iodine, or comparable irradiation of N-iodoamides themselves, gave solutions which showed no $\gamma$-lactone band in the infrared. A strong band at about 1680 cm.$^{-1}$ was, however, present which could be interpreted as due to amide or to the (C=N) band of an imino-lactone. On washing with aqueous sodium hydrogen sulphite the expected $\gamma$-lactone band then appeared. This behaviour is consistent with the presence of either a $\gamma$-iodoamide, which cyclises very easily, or of an iminolactone which hydrolyses with water. In the case of 4-phenylbutyramide, photolysis of the N-iodo compound in the presence of excess t-butyl hypochlorite and iodine yielded a compound which appears to be N-iodo-4-phenyl-butyroaminolactone/iodine chloride complex. This complex can be converted into the desired lactone by hydrolysis, e.g. with mineral acid, preferably after treatment with bisulphite.

In order that the invention may be well understood we give the following examples by way of illustration only:

M.P.'s were determined on the Kofler block unless otherwise specified. Infrared spectra were taken on the Unicam SP. 200 spectrophotometer. t-Butyl hypochlorite was stored over calcium chloride at 0° in the dark. Lead tetra-acetate was a commercial sample dried in vacuo and stored in a desiccator over phosphorus pentoxide and potassium hydroxide pellets. Chloroform, of "Analar" grade, was passed through a column of alumina to remove ethanol and kept over calcium chloride. Methylene dichloride and carbon tetrachloride were dried over calcium chloride, and benzene and ether were dried over sodium wire. Irradiation was carried out under dry, oxygen-free, nitrogen with a 150-w. tungsten lamp or a 125-w. mercury lamp. For irradiation in the cold the Pyrex reaction flask was partially immersed in circulating cold water in a Pyrex crystallising dish, suspended 5 cm. above the lamp. Determination of halogen in N-haloamides was carried out by dissolving a weighed sample in a mixture of acetic acid (3–4 ml.) and potassium iodide (ca. 100 mg.) in the minimum amount of water, and titrating the liberated iodine against standard aqueous sodium thiosulphate (ca. 0.04 N).

Example 1

(i) 3$\beta$-acetoxy-11-oxo-5$\alpha$-pregnane-20-carboxyamide

The acid chloride (1.7 g.) in benzene (10 ml.) was shaken vigorously with concentrated aqueous ammonia (2 ml.) in water (8 ml.) for 5 min., then diluted with cyclohexane (10 ml.) and shaken for a further 5 min. The crude product, separated by filtration, was washed with water and with benzene, and crystallised from methylene dichloride-methanol. The required amide (1.4 g., 86%) formed rods or plates, M.P. 293–295° (evac. tube), $[\alpha]_D$+30.5° (c. 1.41, in 1:1 EtOH—CHCl$_3$), $\nu_{max.}$ in CHCl$_3$) 1595 and 1680 (amide C=O), 1700 (ketone C=O), 1720 (ester C=O), 3450 and 3550 (amide NH) cm.$^{-1}$ (Found: C, 71.3; H, 9.3; N, 3.2. C$_{24}$H$_{37}$NO$_4$ requires C, 71.4; H, 9.2; N, 3.5%).

The amide was also obtained by passing anhydrous ammonia over the acid chloride in benzene, and by reaction of the acid anhydride with aqueous alcoholic ammonia (94% in each case).

Hydrolysis of the foregoing amide (100 mg.) with potassium hydroxide (33 mg.) in dioxane (5 ml.) and methanol (5 ml.) heated under reflux for 10 min. afforded 3$\beta$-hydroxy-11-oxo-5$\alpha$-pregnane-20-carboxyamide, which crystallised from chloroform-benzene in needles, (72 mg.), M.P. 273°, $[\alpha]_D$+48.5° (c. 0.99 in 1:1 EtOH—CHCl$_3$)

(Found: C, 73.3; H, 9.7; N, 4.05. C$_{22}$H$_{35}$NO$_3$ requires C, 73.1; H, 9.8; N, 3.9%).

(ii) Irradiation of 3$\beta$-acetoxy-11-oxo-5$\alpha$-pregnane-20-carboxyamide with lead tetra-acetate and iodine (a) A suspension of the amide (1.0 g.), iodine (3 g.), and lead tetra-acetate (2.0 g.) in chloroform (35 ml.) was stirred at 15° whilst irradiated with a mercury lamp. Another portion (1.6 g.) of lead tetra-acetate was added after 1 hr. and the mixture was then irradiated for a further 5 hrs. A thick precipitate formed after the addition of the second portion of lead tetra-acetate, but redissolved later. The reaction mixture was filtered and the residue was copiously washed, first with hot chloroform, then with hot ethyl acetate. The chloroform and ethyl acetate solutions were separately shaken with aqueous sodium bisulphite, then combined and evaporated in vacuo. The residue (1.3 g.) was heated under reflux with potassium hydroxide (2.5 g.) in ethanol (40 ml.) and water (10 ml.) for 24 hrs. Most of the solvent was removed in vacuo, and the residue was diluted with water and extracted with ethyl acetate. The ethyl acetate solution was washed with dilute sulphuric acid, which removed a crude basic material (33 mg.), and evaporated leaving a neutral residue (35 mg.). After acidification, the aqueous phase was extracted with ethyl acetate, and the extract was boiled under reflux for 2 hrs. Extraction of the ethyl acetate solution with aqueous potassium carbonate gave a solid acid (0.12 g.). Evaporation of the organic phase in vacuo afforded a crude hydroxy-lactone (0.58 g.), $\nu_{max.}$ (in CHCl$_3$)

at 1700 (ketone) 1765 ($\gamma$-lactone), which was acetylated with acetic anhydride (4 ml.) and pyridine (4 ml.) on the steam-bath for 15 min. The crude acetoxy compound (0.64 g.) was chromatographed on alumina (Woelm, acid, act. IV). Elution of the column with benzene yielded the lactone of 3$\beta$-acetoxy-16$\beta$-hydroxy-11-oxo-5$\alpha$-pregnane-20-carboxylic acid which crystallised from benzene-cyclohexane in plates (0.55 g.) M.P. 265–267° (phase change at ca. 240°), $[\alpha]_D$—23° (c. 1.16 in CHCl$_3$), $\nu_{max.}$ (in CHCl$_3$) 1710–1720 (broad, ketone C=O and acetate), 1765 ($\gamma$-lactone), identical with an authentic specimen.

(b) The amide (2.0 g.) and lead tetra-acetate (3.2 g.) suspended in chloroform (25 ml.) boiling under reflux were irradiated with a tungsten lamp while iodine (1.1 g.) in chloroform (40 ml.) was added dropwise at such a rate as to maintain an iodine colour in the mixture. After 1 hr. a permanent colour was formed (0.7 g. iodine added). The irradiation was then continued for a further 3 hrs. during which time the iodine colour became more intense and a yellow solid precipitated. The cooled mixture was then filtered. The residue (2.1 g.) appeared to be a mixture of lead diacetate and lead iodide. A portion (0.6 g.) of the crude product (1.9 g.) isolated as above was chromatographed on alumina (neutral, act. III). Benzene eluted the lactone (30 mg.) M.P. 264° of 3$\beta$-acetoxy-16$\beta$-hydroxy-11-oxo-5$\alpha$-pregnane-20-carboxylic acid. A second crystalline compound (6 mg.) which formed prisms, M.P. 330° (decomp.), from acetone-cyclo-hexane was eluted with methylene dichloride. Other chromatographic fractions were intractable oils.

The remainder (1.3 g.) of the crude reaction product, when worked up as in (a), yielded basic (96 mg.), neutral (0.35 g.), acidic (0.30 g.), and lactonic (0.30 g.) fractions. The lactonic material could not be crystallised directly. A portion (0.22 g.) was acetylated, and the product was chromatographed on alumina. The only identifiable material obtained was the required lactone acetate (.11 g.)

(c) A suspension of the amide (2.4 g.), lead tetra-acetate (2.4 g.), and calcium carbonate (1 g., dried) in chloroform (30 ml.) was treated with iodine (0.7 g.) as in (b) and irradiated with the tungsten lamp for 3 hr.

The crude product (ca. 3 g.) was worked up as in (b), and then afforded acid (.106 g.), neutral (1.50 g.), and lactonic (0.263 g.) fractions. The neutral material crystallised from methylene dichloride in prisms, M.P. and mixed M.P. 272° of 3β-hydroxy-11-oxo-5α-pregnane-20-carboxyamide. The lactonic fraction, when acetylated and crystallised from ether, yielded the pure acetoxy-lactone (117 mg.).

(d) Iodine in carbon tetrachloride was added dropwise with stirring to a suspension of the amide (1.2 g.), calcium carbonate (2.0 g.), and lead tetra-acetate (3.2 g.) in carbon tetrachloride (25 ml.) boiling under reflux while irradiated with the tungsten lamp. After 45 min. (0.9 g. of iodine added) a permanent iodine colour was formed. The mixture was irradiated for a total of 3 hr., then cooled, and diluted with chloroform. The mixture was shaken with dilute hydrochloric acid and the precipitate of lead chloride (1.7 g.) was collected and washed with chloroform. The chloroform solution was washed with aqueous sodium bisulphite and with water and evaporated in vacuo. The gummy residue (1.55 g.) had $\nu_{max}$ at 1710, 1720 and 2,300 (possibly isocyanate) cm.$^{-1}$.

A portion (0.86 g.) of the crude product was mixed with potassium hydroxide (0.6 g.) in water (4 ml.) and dioxane (5 ml.) and heated on the steam-bath for 30 min. with occasional shaking. It was then diluted with methanol to give a homogeneous solution and refluxed for a further 30 min. The mixture was then concentrated in vacuo, acidified with dilute sulphuric acid, and extracted with ethyl acetate. The ethyl acetate extract was washed with 6N hydrochloric acid. When the acidic solution was diluted with water a precipitate was formed, which was extracted with ethyl acetate. The fraction (0.162 g.) so obtained has $\nu_{max}$. at 1765 cm.$^{-1}$ and yielded the required lactone on working up in the usual way. A separate experiment showed that the authentic hydroxy-lactone was extracted from ethyl acetate solution with strong, aqueous hydrochloric acid. The original aqueous acidic extract when treated with sodium hydrogen carbonate solution gave a basic fraction (0.158 g.), $\nu_{max}$. (in CHCl$_3$) at 1605, 1680, 1700, 3500 cm.$^{-1}$ which was acetylated with acetic anhydride/pyridine. The acetylated material could not be purified. The remainder of the reaction product, when worked up in the usual way, afforded neutral (0.175 g.), acidic (0.145 g.) and lactonic (0.163 g.) fractions.

A second portion (0.69 g.) of the crude reaction product was heated with concentrated hydrochloric acid (2 ml.) in ethanol (10 ml.) on the steam-bath for 30 min. A further quantity of acid (5 ml.) was then added and heating was continued for 30 min. The mixture was set aside at room temperature overnight, then diluted with water and extracted with chloroform and with ethyl acetate. The products, obtained in the usual way, were neutral (0.119 g.), basic (0.092 g.), acidic (0.117 g.) and lactonic (0.180 g.) fractions. The combined yield of pure lactone-acetate from both hydrolyses was 0.25 g.

(e) A stirred suspension of the amide (1.5 g.), lead tetra-acetate (5.0 g.), and iodine (3.0 g.) in benzene (40 ml.) was irradiated (mercury lamp) at 15°. A precipitate was formed and the mixture turned brown. After 5 hr. the mixture was filtered and the residue was washed with hot chloroform. The filtrate, when shaken with aqueous sodium bisulphite, deposited an oily precipitate, which redissolved when shaken with ethyl acetate-acetone-dilute hydrochloric acid. The combined organic phases were evaporated in vacuo. The crude product (1.52 g.) had $\nu_{max}$. (in CHCl$_3$) at 1710, 1720, 1755 and 2,300 cm.$^{-1}$. Hydrolysis of the crude product in the usual way afforded acidic (0.157 g.), lactonic (0.440 g.), neutral (0.198 g.) and basic (0.105 g.) fractions. The basic fraction $\nu_{max}$. (in CHCl$_3$) at 1670, 1700 and 3400 cm.$^{-1}$ was purified by dissolution and precipitation from dilute sulphuric acid and was then acetylated with pyridine-acetic anhydride. Chromatography of the product on alumina (Woelm, acid, act. IV) afforded crystalline lactone acetate (36 mg.). Washing of the insoluble residue from the photolysis reaction with hot ethyl acetate-acetone gave a further quantity of crude product (0.25 g.), which when worked up in the usual way gave the required lactone (0.193 g.). The combined yield of lactone acetate was 0.485 g.

Example 2

Irradiation of 3β-acetoxy-11-oxo-5α-pregnane-20-carboxyamide with t-butyl hypochlorite-iodine (a) t-Butyl hypochlorite (0.54 g.) was added to a stirred suspension of the amide (1.5 g.) and iodine (3.0 g.) in benzene, and the mixture was then irradiated (mercury lamp) at 15° for 7 hr. Further portions of the hypochlorite (3× 0.36 g.) were added at the end of the first, second, and third hours. The mixture was then diluted with ethyl acetate (100 ml.) and worked up in the usual way. Acidic (230 mg.), neutral (640 mg.), and lactonic (422 mg.) fractions were isolated. The lactonic fraction afforded pure lactone acetate (329 mg.) after acetylation and chromatography on alumina. The neutral fraction when acetylated with acetic anhydride-pyridine had weak lactonic absorption at 1760 cm.$^{-1}$.

(b) The amide (0.90 g.), iodine (2 g.), and t-butyl hypochlorite (0.54 g.) were stirred in chloroform (30 ml.) at 15° for 10 min. The infrared spectrum showed a new absorption peak at 1640 cm.$^{-1}$. The mixture was then irradiated (mercury lamp) for 5 hr. Further portions of the hypochlorite (3× 0.27 g.) were added at the end of the first, second, and third hours. The infrared absorption peak at 1640 cm.$^{-1}$ disappeared during irradiation but was regenerated after each fresh addition of t-butyl hypochlorite. The reaction mixture was copiously diluted with methylene dichloride and washed successively with aqueous sodium acetate, aqueous sodium thiosulphate, and water. The crude product, obtained by evaporation of the organic phase was a yellow solid (1.18 g.) $\nu_{max}$. 1600 (w), 1710–1720 (broad) cm.$^{-1}$. (Found: I, 9.12%. Corresponds to 39% of stable C-iodo-amide in crude product.) Various attempts to crystallise the crude product were of no avail. When a sample (0.125 g.) was chromatographed a series of yellow oils were eluted, which formed amorphous solids on treatment with solvents. One of these fractions contained iodine, and when treated, first with ethanolic potassium hydroxide, then with dilute sulphuric acid, showed lactonic absorption at 1760 cm.$^{-1}$.

Another portion (120 mg.) of the crude product was treated with zinc powder and acetic acid on the steam-bath for 5 min. The hot mixture was filtered, the residue was washed with acetic acid, and the filtrate was diluted with water and extracted with ethyl acetate. The extract was washed with aqueous sodium hydrogen carbonate, and evaporated. The residue when chromatographed on alumina gave the starting amide (29 mg.) as the only identifiable product.

A sample (85 mg.) of the crude product was boiled with benzene (3 ml.) and pyridine (2 drops) for 10 min., then evaporated. The crude product showed weak lactonic absorption at 1760 cm.$^{-1}$, which was intensified when the sample was shaken with dilute sulphuric acid.

The remainder (0.666 g.) of the crude product was refluxed with potassium hydroxide (0.8 g.) in ethanol (5 ml.) and water (2 ml.) for 5 min. The cooled mixture was diluted with water and extracted with ethyl acetate, and the ethyl acetate solution was washed with aqueous sulphuric acid. Attempts to purify the basic fraction (0.141 g.) obtained by treatment of the acid phase with aqueous sodium hydrogen carbonate were unsuccessful.

The neutral fraction (0.203 g.), obtained by evaporation of the ethyl acetate solution, was then hydrolysed with potassium hydroxide in aqueous ethanol for 2 hr., and the mixture was combined with the aqueous alkaline solution obtained previously. Working up in the usual way afforded acidic (76 mg.), neutral (0.109 g.) and lactonic (0.143 g.) fractions.

Example 3

(i) 3$\beta$-acetoxy-11-oxo-5$\alpha$-pregnane-20-carboxy-N-methylamide

The steroid acid chloride (2.0 g.) in benzene (10 ml.) was shaken vigorously with methylamine hydrochloride (2.0 g.) and sodium hydrogen carbonate (1.4 g.) in water (15 ml.). After 5 min. the mixture was diluted with light petroleum (10 ml.) and shaking was continued for a further 5 min. The precipitate was collected, washed with water and with cyclohexane, and crystallised from chloroform-methanol. The required methylamide formed prisms (1.9 g., 95%): M.P. 308–309° (evac. tube), $[\alpha]_D$+37° (c. 1.13 in 1:1 $CHCl_3$—EtOH), $\nu_{max}$ (in $CHCl_3$) 1665 (amide C=O), 1705 (ketone), 1720 (acetate), and 3500 (N=H) cm.$^{-1}$. (Found: C, 71.7; H, 9.3; N, 3.4. $C_{25}H_{39}NO_4$ requires C, 71.9; H, 9.4; N, 3.4%.)

(ii) Irradiation of 3$\beta$-acetoxy-11-oxo-5$\alpha$-pregnane-20-carboxy-N-methylamide with lead tetra-acetate iodine (a) The methylamide (2.0 g.) and lead tetra-acetate (2.8 g.) suspended in chloroform (50 ml.) boiling under reflux were stirred while iodine (0.8 g.) in chloroform (25 ml.) was added dropwise. The mixture was irradiated with a tungsten lamp. The iodine was rapidly consumed at first, but later (ca. 1 hr.) the colour was regenerated. After 1.5 hr. the mixture was filtered, and the filtrate was washed with aqueous sodium bisulphite and evaporated. A sample (150 mg.) of the crude product (2.1 g.) was hydrolysed in the usual way. The only identifiable product was 3$\beta$-hydroxy-11-oxo-5$\alpha$-pregnane-20-carboxy-N-methylamide, which crystallised from acetone in prisms, M.P. 283–284° (evac. tube), $[\alpha]_D$+54° (c. 1.24 in 1:1 $CHCl_3$—EtOH), $\nu_{max}$ (in $CHCl_3$) at 1665 (amide C=O), 1700 (ketone C=O), 3450 (O—H) and 3500 (amide N—H) cm.$^{-1}$. (Found: C, 73.7; H, 9.8; N, 3.7. $C_{23}H_{37}O_3N$ requires C, 73.6; H, 9.9; N, 3.7%.)

(b) The remainder of the crude product (2.0 g.) from the preceding experiment was irradiated with the tungsten lamp, in chloroform (40 ml.), with lead tetraacetate (3.5 g.), iodine (2.5 g.) and calcium carbonate (2 g.), at the B.P. for 4 hr. A sample (150 mg.) of the crude product (2.0 g.) when hydrolysed in the usual way afforded the 3$\beta$-hydroxy compound (80 mg.) and an acid fraction (25 mg.), which showed weak lactonic absorption at 1765 cm.$^{-1}$.

(c) The residual crude product (1.9 g.) from (b), lead tetra-acetate (5.2 g.), and iodine (1.3 g.), were irradiated with the tungsten lamp, in chloroform (40 ml.) at the B.P. for 6 hr. The crude product when heated in vacuo afforded a sublimate of hexachloroethane (ca. 50 mg.), which crystallised from ether-ethanol in needles, M.P. 186–187° (lit. M.P. 186.8–187.4°). Hydrolysis of the crude product gave a gummy lactonic fraction (67 mg.), which was not purified.

Example 4

(i) 3$\beta$-acetoxy-11-oxo-5$\alpha$-pregnane-20-carboxy-N-phenylamide

Aniline (2.0 ml.) and the steroid acid chloride (2.4 g.) in benzene (10 ml.) and ether (10 ml.) were kept at room temperature for 30 min. The mixture was then shaken with aqueous sulphuric acid and filtered. Crystallisation from aqueous methanol of the residue combined with the material obtained by evaporation of the organic filtrate afforded the required N-phenylamide (2.6 g., 95%) as rods. M.P. 245–246°, $[\alpha]_D$+39° (c. 1.12 in $CHCl_3$), $\nu_{max}$ 1600 (aromatic C=C) 1690 (amide C=O), 1700 (ketone), 1720 (acetate) and 3480 (N=H) cm.$^{-1}$. (Found: N, 3.1. $C_{30}H_{41}NO_4$ requires N, 2.9%.)

(ii) Irradiation of 3$\beta$-acetoxy-11-oxo-5$\alpha$-pregnane-20-carboxy-N-phenylamide with lead tetra-acetate-iodine A suspension of the phenylamide (2.5 g.) and lead tetra-acetate (4.0 g.) in boiling chloroform (40 ml.) was stirred and irradiated (tungsten lamp) while iodine (1.0 g.) in chloroform (25 ml.) was added dropwise during 30 min. Initially the iodine was completely consumed, but its colour reappeared 10 min. after completion of the addition. After 4 hr. irradiation the cooled mixture was washed successively with dilute hydrochloric acid, aqueous sodium bisulphite, and water, and was then evaporated in vacuo. The dark, solid residue (3.13 g.) showed no lactonic absorption in the infrared. When a portion (1.31 g.) of the crude product was hydrolysed in the usual way a lactonic fraction (0.168 g.) was obtained, which, on acetylation with pyridine-acetic anhydride, and crystallisation from methylene dichloride-ether, afforded the lactone of 3$\beta$-acetoxy-16$\beta$-hydroxy-11-oxo-5$\alpha$-pregnane-20-carboxylic acid (116 mg.). A crude neutral fraction (2.0 g.) was also isolated. The remainder (1.54 g.) of the crude reaction product was chromatographed on alumina. The chromatographic fractions were dark oils and amorphous solids, and no crystalline compounds were obtained.

Example 5

Irradiation of o-toluamide with lead tetra-acetate and iodine o-Toluamide (92% yield) was prepared from o-toluyl chloride and concentrated aqueous ammonia at 0°. It crystallised from ethanol-benzene in plates, M.P. 144° (lit. M.P. 144–145°).

o-Toluamide (1.0 g.) and lead tetra-acetate (4.0 g.) in chloroform (50 ml.) were stirred at room temperature while powdered iodine was slowly added. The iodine colour rapidly faded and a white precipitate was formed. When a permanent iodine colour was attained (ca. 1 g. of iodine added) the mixture was irradiated (tungsten lamp) at the B.P. under reflux for 2.5 hr., then cooled, and filtered. The residue (1.9 g.) of lead diacetate was washed with methylene chloride, and the combined filtrate and washing were evaporated in vacuo. The residue had $\nu_{max}$ (in $CCl_3$) at 1590 and 1680 (primary amide), 1710 and 1720 (?) cm.$^{-1}$. When the crude product (1.16 g.) was hydrolysed in the usual way the products included an acid fraction (.054 g.), a neutral fraction (0.35 g., infrared spectrum almost identical with that of o-toluamide), and a crude lactone (0.25 g.), $\nu_{max}$ 1765 cm.$^{-1}$, which afforded phthalide on crystallisation from methylene dichloride-light petroleum.

Example 6

Irradiation of o-toluamide with t-butyl hypochlorite and iodine t-Butyl hypochlorite (1.45 ml., 1.3 g.) was added to a stirred suspension of o-toluamide (1.35 g.) and iodine (3.5 g.) in carbon tetrachloride (40 ml.) at room temperature. The mixture rapidly became light brown then slowly darkened. After 15 min. the mixture was diluted with light petroleum (50 ml.) and the liquid was decanted from the oil which precipitated. The liquid on evaporation in vacuo gave a gum (0.91 g.) which showed strong absorption at 2300 cm.$^{-1}$ (isocyanate). The oil was washed with light petroleum, and then stirred with refluxing carbon tetrarchloride (30 ml.) while irradiated with the mercury light for 1 hr. during which time an intense iodine colour formed. When the crude product (0.7 g.) was worked up in the usual way the fractions obtained were crude phthalide (0.23 g.) and crude o-toluamide (0.38 g.). The crude irradiation product had $\nu_{max}$ at 1600 and 1680 (primary amide), 1720 (iminolactone?), 1765 ($\gamma$-lactone), 3460 and 3580 (primary amide) cm.$^{-1}$.

Example 7

Irradiation of octadecanamide with lead tetraacetate and iodine

Octadecanamide was prepared by adding octadecanoyl chloride to concentrated aqueous ammonia at 0°. It crystallised from benzene in plates, M.P. 109° (lit. M.P. 109°).

A suspension of octadecanamide (2.0 g.), lead tetraacetate (9.4 g.), and iodine (3 g.) in benzene (40 ml.) was stirred at 30° and irradiated with a mercury lamp. After 2 hr. the iodine was completely consumed, and another 2 g. was therefore added. Irradiation was continued for a further 3 hr. and the solution was then filtered. The residue was washed with ethyl acetate and the combined filtrate and washings were shaken with aqueous sodium bisulphite and evaporated in vacuo. The crude product (2.67 g.) had $\nu_{max.}$ (in $CHCl_3$) at 1595 and 1680 (primary amide), 1725 (δ-lactone?) 1765 (γ-lactone), 2346 and 2356 (amide N–H) cm.$^{-1}$. It was hydrolysed under reflux for 2 hr. with potassium hydroxide (2 g.) in ethanol (20 ml.) and water (5 ml.). Water (15 ml.) was added to the cooled mixture, which was then extracted with light petroleum. The extract was washed with 50% aqueous ethanol and evaporated in vacuo yielding a neutral gum (0.209 g.), which afforded octadecanamide on crystallisation. The aqueous ethanolic solution was acidified with dilute sulphuric acid, heated under reflux for 2 hr., and reduced in volume by evaporation. Extraction with ethyl acetate afforded a yellow gum (1.93 g.) with $\nu_{max.}$ at 1720 (δ-lactone) and 1765 (γ-lactone) cm.$^{-1}$, which, on crystallisation from aqueous methanol, gave γ-stearolactone (1.20 g.), M.P. 49–50° (lit. M.P. 50°), $\nu_{max.}$ (in $CHCl_3$) at 1765 (γ-lactone) cm.$^{-1}$. The aqueous methanolic mother-liquor was evaporated in vacuo and the residue (0.675 g.) was heated on the steam-bath for 1 hr. It was then dissolved in light petroleum and chromatographed on silica-gel. Methylene dichloride eluted γ-stearolactone (0.34 g.), which crystallised from light petroleum (B.P. 40°) at −40° in needles, M.P. 38–39°, $\nu_{max.}$ (in $CHCl_3$) at 1720 (δ-lactone) cm.$^{-1}$. The analytical sample was further purified by molecular distillation at 100°/10$^{-5}$ mm. (Found: C, 76.0; H, 11.95; O, 11.5. $C_{18}H_{34}O_2$ requires C, 76.5; H, 12.1; O, 11.3%.)

When γ-stearolactone (0.497 g.) was heated for 1 hr. on the steam-bath with potassium hydroxide (0.8 g.) in water (25 ml.) and the resultant solution was cooled in ice and cautiously acidified a precipitate of 4-hydroxy-octadecanoic acid was formed. It crystallised from methylene dichloride in plates (0.323 mg.), M.P. 86–87° (lit. M.P. 87°), $\nu_{max.}$ (in $CHCl_3$) 1705 (COOH)cm.$^{-1}$. γ-Stearolactone (80 mg.) when heated with benzylamine (0.2 ml.) in a sealed tube at 100° for 1 hr., gave N-benzyl-4-hydroxyoctadecanamide, which crystallised from methanol in plates (70 mg.), M.P. 96–97°, $\nu_{max.}$ (in $CHCl_3$) at 1660 and 3480 (secondary amide) cm.$^{-1}$ (Found: C, 77.0; H, 11.0; O, 8.2. $C_{22}H_{43}NO_2$ requires C, 77.1; H, 11.1; O, 8.2%.)

δ-Stearolactone was similarly converted into 5-hydroxy-octadecanoic acid, M.P. 81° (lit. M.P. 82°), $\nu_{max.}$ (in $CHCl_3$) 1710 (COOH) cm.$^{-1}$. (Found: C, 72.2; H, 12.0. Calc. for $C_{18}H_{36}O_3$: C, 71.95; H, 12.1%), and into N-benzyl-5-hydroxy-octadecanamide M.P. 90–92°, $\nu_{max.}$ (in $CHCl_3$) at 1660 and 3480 (secondary amide) cm.$^{-1}$. Found: C, 76.9; H, 11.0. $C_{25}H_{43}NO_2$ requires C, 77.1; H, 11.1%.)

Example 8

Irradiation of octadecanamide with t-butyl hypochlorite and iodine

When t-butyl hypochlorite (1.8 ml., 1.6 g.) was added with stirring to octadecanamide (2.3 g.) and iodine (5 g.) in benzene (50 ml.) the colour changed to light brown. After 15 min. the mixture was irradiated with the mercury lamp at <30° for 7 hours. Further portions (3 × 0.8 ml.) of t-butyl hypochlorite were added at the end of the first, second and third hours. At the end of the irradiation period the reaction mixture was washed with water. The aqueous phase was acidic, and when treated with sodium hydrogen carbonate solution it deposited a dense precipitate of iodine. The organic phase was diluted with ethyl acetate, washed with aqueous sodium bisulphite and with water, and evaporated in vacuo. The crude product (3.22 g.) was a light brown solid with strong absorption maxima at 1720 (δ-lactone) and 1765 (γ-lactone) cm.$^{-1}$. It was hydrolysed under reflux for 2 hr. with potassium hydroxide (2 g.) in ethanol (20 ml.) and water (5 ml.). The cooled hydrolysis mixture was diluted with water (15 ml.) and extracted with light petroleum. The ethanolic solution was acidified with dilute sulphuric acid and boiled under reflux for 1.5 hr. After concentration by evaporation the mixture was diluted with water and extracted with ethyl acetate. The combined acid and lactone (2.31 g.) obtained by evaporation of the extract was dissolved in light petroleum and shaken with potassium carbonate (2 g.) dissolved in water (25 ml.) and methanol (25 ml.). Evaporation of the petroleum solution afforded a lactonic fraction (1.60 g), $\nu_{max.}$ (in $CHCl_3$) at 1720 (δ-lactone) and 1765 (γ-lactone) cm.$^{-1}$. The aqueous methanol solution was acidified and extracted with ethyl acetate. The residue (0.8 g.) obtained by evaporation of the extract had $\nu_{max.}$ (in $CHCl_3$) at 1705 ($CO_2H$), 1720 (δ-lactone) and 1765 (γ-lactone) cm.$^{-1}$. Crystallisation of the lactonic fraction from aqueous methanol gave γ-stearolactone, M.P. 49° (0.96 g.). Chromatography of the residue from the mother-liquor on silica-gel gave a further quantity (0.35 g.) of γ-stearolactone and some δ-stearolactone (0.12 g.). Chromatography of the acid fraction yielded γ-stearolactone (0.08 g.) and δ-stearolactone (0.39). The total products obtained were thus: γ-stearolactone (1.40 g.) and δ-stearolactone (0.51 g.).

The irradiation of octadecanamide with t-butyl hypochlorite and iodine was repeated several times under conditions similar to those employed in the preceding experiment. The results are shown in Table II, two modifications of the working-up procedure are shown below:

Experiment (IV). The crude product from the reaction was not hydrolysed but was dissolved in light petroleum and chromatographed or silica-gel. The only identifiable compounds eluted were δ- and γ-stearolactone.

Experiment (VII). After the irradiation the reaction mixture was heated with zinc dust and t-butanol on the water-bath for 1 hr. The mixture was then filtered, evaporated, and hydrolysed in the usual way.

Example 9

Irradiation of hexanamide with t-butyl hypochlorite-iodine

Hexanamide (2.5 g.) in benzene (50 ml.) was mixed with iodine (8 g.) and t-butyl hypochlorite (3.0 ml.) and irradiated at <30° for 6 hr. Further portions of the hypochlorite (2.5 ml., 1.5 ml.) were added at the end of the first and second hours. The mixture when diluted with ethyl acetate, washed with aqueous sodium bisulphite, and evaporated afforded a liquid, crude product (3.45 g.), which when hydrolysed in the usual way gave neutral (0.376 g.), acidic (0.525 g.), and lactonic (1.212 g.) fractions. The lactone fraction was an oil with $\nu_{max.}$ (film at 1700, 1730, and 1765 cm.$^{-1}$.

Example 10

Preparation of N-chlorobenzamide t-Butyl hypochlorite (1.45 ml., 1.30 g.) was added to a stirred suspension of benzamide (1.2 g.) in methylene dichloride (20 ml.) at room temperature without illumination. There was no apparent reaction. After 10 min. bromine (2 drops) was added. The bromine colour faded and a clear solution was rapidly formed (during 2 min.). After 10 min. the mixture was evaporated in vacuo and the residue was washed with light petroleum and crystallised from light petroleum-methylene dichloride. N-chlorobenzamide was obtained as rods (1.3 g., 85%), M.P. 117–118° (lit. M.P. 117°) $\nu_{max}$. (in Nujol) 1645 (amide C=O), 3180 (N—H) cm.$^{-1}$.

Example 11
No-chloro-octadecanamide t-Butyl hypochlorite (0.7 ml., 0.63 g.) and bromine (1 drop) were added to a stirred suspension of octadecanamide (1.4 g.) in methylene dichloride (20 ml.), at room temperature without illumination. There appeared to be no reaction in the cold but on gentle warming of the mixture a clear solution was formed. The solution was set aside for 10 min. then evaporated in vacuo. The residue of N-chloro-octadecanamide crystallised from methanol in plates (1.3 g., 83%) M.P. 83°. The analysis sample was recrystallised from methylene dichloride (Found: Cl, 11.6; C$_{18}$H$_{36}$ClNO requires Cl, 11.15%). $\nu_{max}$. (in Nujol) 1660 (amide C=O), 3240 (N—H) cm.$^{-1}$.

Example 12
N-chloro-N-methyloctadecanamide t-Butyl hypochlorite (0.55 ml., 0.49 g.) bromine (3 drops), and N-methyloctadecanamide (1.0 g.) in methylene dichloride (15 ml.) were stirred at 15° without illumination for 25 min., during which time the bromine colour faded and a clear solution formed. The solution was then evaporated in vacuo and the residue was crystallised from methanol. N-chloro-N-methyloctadecanamide formed rods (0.97 g., 85%), M.P. 65°. (Found: Cl, 10.5, 10.6 (iodimetric). C$_{19}$H$_{38}$ClNO requires Cl, 10.7%, $\nu_{max}$. (in CHCl$_3$) 1660 (amide C=O) cm.$^{-1}$.

Example 13
Preparation of N-iodobenzamide (a) A suspension of benzamide (1.2 g.) and iodine (3.0 g.) in carbon tetrachloride (20 ml.) was stirred at room temperature without illumination while t-butyl hypochlorite (1.45 ml., 1.3 g) was added dropwise during 5 min. The colour changed to pale brown and a precipitate formed. The mixture was stirred for 30 min., then filtered. The residue, which was washed with carbon tetrachloride and dried, was almost pure N-iodobenzamide (1.9 g. 77%), M.P. 120°. The analytical sample crystallised from acetone light petroleum in pale yellow needles, M.P. 123–124° (decomp.), $\nu_{max}$. (in Nujol) 1600 (amide C=O), and 3240 (N—H) cm.$^{-1}$. (Found: C, 34.2; H, 2.3; N, 5.4; I, 50.9. C$_7$H$_6$INO requires C, 34.1; H, 2.45; N, 5.7; I, 51.35%.) The crystalline compound slowly generated iodine. Decomposition occurred more rapidly in solution.

(b) Powdered iodine was added without illumination to a stirred suspension of benzamide (1.2 g.) and lead tetra-acetate (2.2 g.) in chloroform (20 ml.) under nitrogen at room temperature at such a rate that the colour of iodine was maintained. After 1 hr. (1.2 g. of iodine added) the colour became permanent. The mixture was then filtered. The residue, which was washed with chloroform, was N-iodobenzamide (1.3 g., 53%), M.P. 123°. The filtrate contained an inseparable mixture of N-iodobenzamide and lead salts.

Example 14
N-iodohexanamide

Hexanamide (1.1 g.) when treated with t-butyl hypochlorite (1.3 ml., 1.17 g.) and iodine (3 g.) as in the previous experiment afforded N-iodohexanamide (2.1 g., 91%), which crystallised from methylene dichloride-light petroluem in minute rods, M.P. 97°, $\nu_{max}$. (in Nujol) 1570, 1600 (amide C=O) and 3,300 (N—H) cm.$^{-1}$. (Found: I, 52.6 (iodimetric). C$_6$H$_{12}$INO requires I, 52.6%.)

Example 15
N-iodo-octadecanamide (a) t-Butyl hypochlorite (1.5 ml., 1.35 g) and iodine (3.0 g.) in methylene dichloride (30 ml.) were stirred at room temperature for 10 min. during which time the colour of the solution changed to light brown. When octadecanamide (2.8 g.) was added the colour changed to yellow and a precipitate formed. Filtration of the mixture after 10 min. gave isomer (I) of N-iodo-octadecanamide (3.8 g., 94%), M.P. ca. 114° (decomp.), which was washed with light petroleum and dried. This isomer (1) crystallised from chloroform-light petroleum in minute plates, M.P. 114–115° (decomp.), $\nu_{max}$. (in Nujol) 1640 (amide C=O) and 3270 (N—H) cm.$^{-1}$. (Found: I, 31.2, 30.8 (iodimetric). C$_{18}$H$_{36}$INO requires I, 31.0%.)

The same product was obtained when the previous procedure was repeated with cooling in ice and with benzene as solvent. The isomer (I) was also formed when t-butyl hypochlorite was added to octadecanamide and iodine in benzene with ice cooling.

(b) t-Butyl hypochlorite (1.5 ml., 1.35 g.) was added to a stirred suspension of octadecanamide (2.8 g.) and iodine (3 g.) at room temperature. The mixture became warm, the colour changed to light brown, and a precipitate was formed. After 10 min. the mixture was diluted with light petroleum and filtered. The residue was an isomer (II) of N-iodo-octadecanamide (2.95 g., 74%), M.P. ca. 120°. A sample crystallised from acetone in rods, M.P. 120–122° (decomp.), $\nu_{max}$. (in Nujol) 1565, 1600, and 1635 (amide C=O?), and 3280 (N—H) cm.$^{-1}$. (Found: I, 31.0, 31.3 (iodimetric). C$_{18}$H$_{36}$INO requires I, 31.0%.) When mixed with isomer (I) a M.P. of ca. 114–118° was observed.

The same isomer (II) was obtained when isomer (I) was crystallised from ethyl acetate or from acetone, or when octadecanamide was stirred with t-butyl hypochlorite-iodine in benzene for 5 hrs. (see below).

Example 16
Irradiation of N-iodohexanamide

The iodoamide (29.0 mg.) was dissolved in dry, ethanol-free chloroform (5 ml.) The infrared spectrum had $\nu_{max}$. at 1675 (amide C=O) and 3430 (N—H) cm.$^{-1}$. The solution was stored in the dark at room temperature for 30 min. The infrared spectrum was then unchanged. The solution was then irradiated (mercury lamp) through Pyrex at 15°. After 10 min. the infrared spectrum showed new absorption maxima at 1595, 1640, 1765, 1800 and 3540 cm.$^{-1}$. After 25 min. irradiation the maximum at 1800 cm.$^{-1}$ had disappeared, a new shoulder occurred at 1720 cm.$^{-1}$ and the maxima at 1595, 1640, 1765, and 3540 cm.$^{-1}$ had increased in intensity. The mixture was then shaken with one drop of acidified, saturated potassium iodide solution and dried. The solution now had $\nu_{max}$. at 1600 and 1675 (primary amide C=O), 1720 (δ-lactone?), 1765 (γ-lactone), 3430 and 3540 (primary amide N—H) cm.$^{-1}$. The results indicate the formation of an unstable intermediate with $\nu_{max}$. at 1640 cm.$^{-1}$.

Example 17
Irradiation of N-iodo-octadecanamide (a) The lower melting form (I) of the iodoamide (2.84 g.), suspended in benzene (50 ml.) with stirring was irradiated (mercury lamp) for 5 hrs. at <20°. Filtration of the mixture afforded a solid (1.35 g.), which had an infra red spectrum in Nujol identical with that of pure octadecanamide. The filtrate was washed with aqueous sodium bisulphite and evaporated in vacuo. The residue (0.73 g.), when hydrolysed in the usual way afforded a clear yellow gum (0.586 g.), $\nu_{max.}$ (in $CHCl_3$) at 1700 ($CO_2H$) and 1765 ($\gamma$-lactone) cm.$^{-1}$.

(b) When the less-soluble, higher melting, form (II) of the iodoamide (1.54 g.) was irradiated as in the preceding experiment, the insoluble material (1.25 g.) was unchanged iodoamide (II). The soluble product (232 mg.), when hydrolysed in the usual way, gave a gum (104 mg.) with $\nu_{max.}$ (in $CHCl_3$) at 1700 and 1765 cm.$^{-1}$.

(c) A solution of iodoamide (I), (53 mg.) in ethanol-free chloroform (7 ml.) was stable in the dark at ca. 30°. It had $\nu_{max.}$ 1605 (w) and 1680 cm.$^{-1}$. The solution was irradiated with the mercury lamp. Within 10 min. an intense iodine colour had developed and the solution now had $\nu_{max.}$ at 1600 (m), 1680, and 1700 cm.$^{-1}$. Similar results were obtained when a sample of the high-melting form was similarly treated.

Example 18

Reaction of octadecanamide with t-butyl hypochlorite-iodine without illumination The amide (2.0 g.), iodine (5 g.) and t-butyl hypochlorite (1.6 ml.) in benzene (40 ml.) were stirred at 20° without illumination (flask shielded with foil) for 5 hours. Further portions (3×0.6 ml.) of t-butyl hypochlorite were added at the end of the first, second, and third hours. The mixture was then filtered. The residue (2.334 g.), which was washed with benzene and light petroleum, was an isomer (II) of N-iodo-octadecanamide. The filtrate, after washing with aqueous sodium bisulphite, and the residue (0.497 g.) obtained upon evaporation of the solution was hydrolysed in the usual way. No lactonic fraction was isolated.

Example 19

Potassium t-butoxide (from dissolving potassium (800 mg.) in excess t-butyl alcohol and then removing the excess azeotropically with benzene) in benzene (100 ml.) was treated with iodine (8.17 g.) and the precipitated potassium iodide removed by filtration (exclusion of moisture). Octadecanamide (940 mg.) was added to the filtrate and the solution stirred for 30 min. at room temperature. Withdrawal of an aliquot and dilution with light petroleum gave a precipitate which on crystallisation from acetone afforded isomer B of N-iodo-octadecanamide. The reaction solution was photolysed with a mercury arc lamp at room temperature for 7 hrs. Working up as in Example 7 gave $\gamma$-sterolactone (180 mg.) and $\delta$-stearolactone (20 mg.)

Example 20

Lactonisation of 4-phenylbutyramide 4-phenylbutyramide (1.60 g.) and iodine (7.40 g.) in benzene (50 ml.) were treated with t-butyl hypochlorite (2.4 ml.) with stirring for 15 min. at room temperature. The stirred reaction mixture was photolysed with a 125-w. mercury arc lamp at <30 for 7 hrs., further t-butyl hypochlorite (3×0.8 ml.) being added after the first three successive hours. The crystalline precipitate was filtered (2.34 g.) and crystallised quickly from methylene dichloride to furnish N-iodo-4-phenylbutyroiminolactone iodine chloride complex M.P. 110–112°, $\gamma_{max.}$ 224 m$\mu$ ($\epsilon$ 2,800 in tetrahydrofuran), $\nu_{max.}^{Nujol}$ 1600, 260, and 210 cm.$^{-1}$ (Found: C, 26.7; H, 2.55; Cl, 8.75; I, 56.7. $C_{10}H_{10}ClI_2NO$ requires C, 26.7; H, 2.25; Cl, 7.9; I, 56.5%.) This complex (300 mg.) was heated with saturated aqueous sodium hydrogen sulphite (2 ml.) and 2 N aqueous sulphuric acid (5 ml.) on the steam bath for 10 min. Extraction into ethyl acetate gave 4-phenylbutyrolactone (69 mg.), identical with an authentic specimen. This lactone (30 mg.) in ethanol (2 ml.) was saturated with ammonia gas at 0° and set aside for 12 hrs. Removal of the solvent in vacuo and crystallisation from ether gave 4-hydroxy-4-phenylbutyramide, M.P. 84–85°.

The iodine chloride complex (465 mg.) in benzene (5 ml.) was treated with pyridine (103 mg.) and the precipitate (small) discarded. On addition of light petroleum pyridine-iodine chloride complex (M.P., mixed M.P. and U.V. and I.R. spectra) was deposited.

The iodine chloride complex (130 mg.) in tetrahydrofuran (3 ml.) was treated with triethylamine (1 ml.) the precipitate was filtered and fractionally crystallised to furnish triethylamine hydrochloride (M.P. and mixed M.P.) and triethylamine hydroiodide (M.P. and mixed M.P.)

The iodine chloride complex (200 mg.) in tetrahydrofuran (25 ml.) was shaken with Raney nickel (2 g.) for 12 hrs. Filtration, removal of the solvent in vacuo and crystallization from benzene-light petroleum gave 4-phenylbutyramide (40 mg.), M.P. 81–82°.

Example 21

Preparation and lactonisation of 4-methylhexanamide (+)-Citronellol (25 g.) was treated with excess toluene-p-sulphonyl chloride in pyridine at room temperature overnight and the derived toluene-p-sulphonate was purified by filtration in light petroleum through alumina (Grade V) to give a colourless oil (27 g.), $[\alpha]_D+1°$, (c. 107). This toluene-p-sulphonate (15 g.) in methylene dichloride (150 ml.) was ozonised at 0° for 16 hrs. After removal of the solvent in vacuo the ozonide was reduced with excess of ethereal lithium aluminum hydride. Working up gave 4-methylhexan-1-ol (3 g.), B.P. 80–84°/22 mm., $[\alpha]_D+2.6°$ (c. 1.50). This alcohol (3.0 g.) in acetone (22.5 ml.) was added to chromium trioxide (5.1 g.) in conc. sulphuric acid (8.1 g.) and water (25.5 ml.) and left for 1½ hrs. Working up gave 4-methylhexanoic acid (1.75 g.), B.P. 114–117°/15 mm., $[\alpha]_D+5°$ (c. 1.02). This acid (1.75 g.) was treated with excess of thionyl chloride and the excess removed in vacuo. The derived acid chloride in dry ether was added to conc. aqueous ammonia with shaking. Removal of the ether in vacuo gave 4-methylhexanamide (1.3 g.), M.P. (from light petroleum) 97–98°, $[\alpha]_D+11°$ (c. 0.85).

4-methylhexanamide (1.0 g.) and iodine (5.3 g.) in benzene (40 ml.) was treated with t-butylhypochlorite (1.8 ml.) and stirred for 15 min. The reaction mixture was then photolysed with a 125 w. mercury arc lamp at <30° for 7 hrs. Further t-butyl hypochlorite (3×0.6 ml.) was added after the first three successive hours. After cooling to 0° part of the crystalline precipitate (1.11 g.) was filtered off. The remainder of the precipitate and the filtrate were combined and the solvent removed in vacuo. The residue was hydrolysed in the usual manner and afforded ($\pm$)-4-methyl-4-ethylbutyrolactone (360 mg.), B.P. 75–78°/6 mm., $[\alpha]_D\pm0°$ (c. 1.06), rotation 0° at all accessible wavelengths. (Found: C, 65.7; H, 9.5. Calc. for $C_7H_{12}O_2C$, 65.6; H, 9.4%.)

The crystalline precipitate referred to above was crystallised from ethylene dichloride to give N-iodo-4-methyl-4-ethylbutyroiminolactone iodine chloride complex, M.P. 113–115°, $\nu_{max.}^{Nujol}$ 1610 cm.$^{-1}$ (Found: C, 20.05; H, 2.6; I, 61.5. $C_7H_{12}ClI_2NO$ requires C, 20.25; H, 2.9; I, 61.1%.) This compound (280 mg.) was heated with saturated aqueous sodium hydrogen sulphite (2 ml.) and 1 N aqueous sulphuric acid (5 ml.) on the steam bath for 10 min. Extraction into ethyl acetate gave 4-methyl-4-ethylbutyrolactone identical with material described above.

The following tables show experimental conditions used in the irradiation of two amides together with the yields of products obtained.

TABLE I.—LACTONISATION OF 3β-ACETOXY-11-OXO-5α-PREGNANE-20-CARBOXYAMIDE

Summary of Experimental Conditions and Yields of Products (figures in parentheses indicate number of moles of compound per mole of amide): Working up as in Example 1.

| | Weight of amide, g. | Weight of Pb(OAc)$_4$ | Weight of Iodine, g. | Weight of CaCO$_3$, g. | Temp., degrees | Reaction Time, hr. | Solvent | Products | | | | |
|---|---|---|---|---|---|---|---|---|---|---|---|---|
| | | | | | | | | Neutral | Basic | Acidic | Lactonic | Pure lactone |
| I | 1.0 | 3.6 g.[a] (3.3) | 3 | | 15 | 6 | CHCl$_3$ | 35 mg. | 33 mg. | 0.12 g. | 0.58 g. | 0.55 g. (0.55). |
| II | 2.0 | 3.2 g. (1.45) | [b] 0.7 | | 56 | 4 | CHCl$_3$ | 0.35 g.[c] | 96 mg.[e] | 0.30 g.[c] | 0.30 g.[c] | 0.11 g.[e] 0.184 g.[d] (0.0). |
| III | 2.4 | 2.4 g. (0.9) | [b] 0.7 | 1 | 56 | 3 | CHCl$_3$ | 1.50 g. | | 0.106 g | 0.263 g. | 0.117 g. (0.05). |
| IV | 1.2 | 3.2 g. (2.4) | [b] 0.9 | 2 | 80 | 3 | CCl$_4$ | 0.294 g | 0.25 g. | 0.26 g. | 0.34 g. | 0.25 g. (0.21). |
| V | 1.5 | 5.0 g. (3.0) | 3 | | 15 | 5 | C$_6$H$_6$ | 0.198 g | 0.105 g. | 0.157 g | 0.633 g. | 0.485 g. (0.32). |
| | | Weight of t-BuOCl | | | | | | | | | | |
| VI | 1.5 | 1.6 g.[a] (4.0) | 3 | | 15 | 7 | C$_6$H$_6$ | 0.64 g.[f] | | 0.23 g. | 0.422 g. | 0.33 g. (0.22). |
| VII | 0.9 | 1.35 g.[a] (5.5) | 2 | | 15 | 5 | CHCl$_3$ | 0.109 g | 0.141 g | 76 mg. | 0.163 g.[b] 0.30 g.[d] | |

[a] Added in several portions.
[b] Added dropwise in solution.
[c] From 60% of the crude product.
[d] Calculated on 100% of crude product.
[e] Combined yields from two hydrolyses.
[f] Yields some lactone after acetylation.
[h] From 55% of crude product.

TABLE II.—LACTONISATION OF OCTADECANAMIDE BY PHOTOLYSIS

[Summary of Experimental Conditions and Yields of Products (figures in parentheses indicate number of moles of compound per mole of amide): Working up as in Example 7]

| Experimental Conditions | | | | | | Yields of Products | | | | |
|---|---|---|---|---|---|---|---|---|---|---|
| Weight of amide | Weight of ClOBuγ | Weight of Iodine | Temp., degrees | Time, hr. | Solvent | Neutral, g. | Acid, g. | Total crude lactone, g. | γ-lactone | δ-lactone |
| 2.8 g | 1.6 g. (1.5) | 3 g. (1.2) | <30 | 2.5 | Benzene | [a] 1.9 | 0.44 | 0.23 | | |
| 2.8 g | 2.6 g. (2.4) | 6 g. (2.4) | <30 | 2.5 | do | 0.54 | [b]1.34 | 0.90 | | |
| 2.05 g.[c] | 3.15 g.[c] (4.1) | 5 g. (2.8) | <30 | 4 | do | 0.46 | [b]0.65 | 1.22 | | |
| 2.8 g | 4.5 g.[c] (4.2) | 7 g. (2.8) | <30 | 6 | do | (d) | (d) | (d) | 0.93 g. (.33) | 0.45 g. (.16). |
| 2.8 g | 4.5 g.[c] (4.2) | 7 g. (2.8) | <30 | 6 | do | 0.42 | [b]1.15 | 1.83 | 1.54 g. (.55) | |
| 2.3 g | 3.8 g.[c] (4.3) | 5 g. (2.4) | <30 | 7 | do | 0.31 | [b]0.8 | 1.60 | 1.40 g. (.61) | 0.5 g. (.22). |
| 2 g | 3.1 g.[c] (4.1) | 5 g. (2.8) | <30 | 7 | do | 0.22 | 0.74 | 0.95 | 0.64 g. (.32) | |
| | Pb(OAc)$_4$ | | | | | | | | | |
| 2.0 g | 9.4 g. (3.0) | 5 g. (2.8) | <30 | 5 | do | 0.21 | | 1.93 | 1.20 g. (.60) | 0.34 g. (.17)? |

[a] Yields octadecanamide on crystallisation.
[b] Contains some γ- and δ-lactone.
[c] Added in several portions.
[d] Crude product chromatographed.
[e] Crude product treated with zinc powder.

I claim:

1. A process for the preparation of a lactone in which an N-bromo, chloro or iodo carboxylic primary or secondary amide possessing a carbon-attached hydrogen atom conformationally adjacent to the nitrogen atom of the N-halogeno amide group thereof, is subjected to homolytic fission of the nitrogen-halogen bond thereof whereby there is formed, by spontaneous or subsequent hydrolysis, a lactone ring wherein the carbonyl group of the amide group initially present is joined by a further oxygen atom to the carbon atom initially carrying the conformationally adjacent hydrogen atom.

2. A process as claimed in claim 1 in which the amide is an N-iodo- or N-chloro- amide.

3. A process as claimed in claim 1 in which homolytic fission is brought about by photolysis.

4. A process as claimed in claim 3 in which photolysis is effected by irradiating the amide with radiation of a wavelength absorbed by the nitrogen-halogen bond.

5. A process as claimed in claim 1 in which there is a subsequent hydrolysis effected by an alkaline substance selected from the group consisting of alkali metal hydroxides, carbonates and alkoxides.

6. A process as claimed in claim 1 in which the starting amide is an N-chloro or N-bromo-amide produced by reacting the corresponding unhalogenated amide with an alkali metal hypochlorite or hypobromite or with a tertiary alkyl hypochlorite or hypobromite in the presence of free chlorine or bromine.

7. A process as claimed in claim 1 in which the starting amide is an N-iodo-amide produced by reacting the corresponding uniodinated amide with iodine and a heavy metal oxide or acylate.

8. A process as claimed in claim 1 in which the starting amide is an N-iodo-amide produced by reacting the corresponding uniodinated amide with iodine and a hypochlorite, hypobromite or nitrite ester of a tertiary alcohol.

9. A process as claimed in claim 8 in which the uniodinated amide is reacted with tertiary butyl hypochlorite and iodine.

10. A process as claimed in claim 1 in which the amide is subjected to homolytic fission without isolation from the reaction medium used for its preparation.

11. A process as claimed in claim 7 in which the heavy metal oxide or acylate is used in excess.

12. A process as claimed in claim 1 in which the N-halogeno amide has the formula $$\begin{array}{c} R^1 \;\; H \;\;\;\;\; R^1 \;\;\;\;\; R \\ \diagdown | \;\;\;\;\;\;\;\;\; | \;\;\;\;\;\;\;\;\; | \\ C-X-C-CO-N-Y \\ \diagup \;\;\;\;\;\;\;\;\; | \\ R^1 \;\;\;\;\;\;\;\;\; R^1 \end{array}$$

where R is selected from the class consisting of a hydrogen atom and aliphatic, araliphatic and aromatic groups, X is selected from the class consisting of methylene, methylidene, methylidyne and imino groups and nitrogen, oxygen and sulphur atoms, Y is selected from the class consisting of chlorine, bromine and iodine atoms and $R^1$ is selected from the class consisting of a hydrogen atom, aliphatic, cycloaliphatic, araliphatic and aromatic groups, aliphatic and araliphatic groups attached by a double bond and represented by two groups $R^1$ and cycloaliphatic, aromatic and heterocyclic ring structures represented by at least two groups $R^1$.

13. A process as claimed in claim 1 wherein the reaction-mixture resulting from said homolytic fission is hydrolysed under neutral or acid conditions whereby the desired lactone is formed.
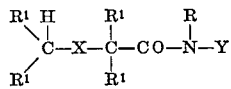
14. A process as claimed in claim 8 in which said ester of a tertiary alcohol is used in excess.
References Cited
UNITED STATES PATENTS
2,971,959   2/1961   Waugh et al. _____ 260—309.15
LEWIS GOTTS, *Primary Examiner.*
H. A. FRENCH, *Examiner.*